Jan. 25, 1966 M. SCHWARTZ ET AL 3,230,824

SOUND RECORD CARRIER

Filed May 31, 1961 3 Sheets-Sheet 1

INVENTORS
MORRIS SCHWARTZ
WERNER K. BENDER

BY Hane and Nydick

ATTORNEYS

SOUND RECORD CARRIER

Filed May 31, 1961 3 Sheets-Sheet 2

INVENTORS
MORRIS SCHWARTZ
WERNER K. BENDER
BY
Hane and Nydick
ATTORNEYS

INVENTORS
MORRIS SCHWARTZ
WERNER K. BENDER
BY Hane and Nydick
ATTORNEYS

United States Patent Office 3,230,824 Patented Jan. 25, 1966

3,230,824
SOUND RECORD CARRIER

Morris Schwartz and Werner K. Bender, Plainville, Conn., assignors to The Kalart Company Inc., Plainville, Conn.

Filed May 31, 1961, Ser. No. 113,771
6 Claims. (Cl. 88—26)

The present invention relates to a sound record carrier bearing a sound record area on which a message is recorded in the form of a plurality of parallel rectilinear sound track sections disposed side by side, and more particularly to a carrier bearing one or several sound record areas of the kind above referred to and generally also one or several picture areas.

Simultaneous reproduction of a recorded message and viewing of a picture area are effected by inserting the carrier in suitable and known sound reproducing and picture viewing apparatus in which the sound track sections are sequentially scanned and the picture is made viewable while the carrier is stationary in the apparatus. The message may consist of any recorded sound such as voice, music, natural sounds, for instance, heart beats, noise of machinery, etc. The recorded sound may also be outside the audible frequency range in which event equipment responsive to such sounds may trigger other equipment.

According to one aspect of the invention, several picture areas and sound record areas may alternate in one row, or all the picture areas may be disposed in one row and all the sound record areas in a second parallel row. Each of the picture areas is paired with a sound record area and each such pair constitutes a program or presentation.

The concept of the invention further encompasses various types of sound tracks and various types of carrier material. The message may be recorded by the variable density method or the variable area method. Recording may be effected photographically or magnetically. The sound track may also be printed with magnetically conductive ink or ordinary printer's ink on a suitable carrier surface such as a sheet of paper. Printing is primarily suitable for variable area type tracks and may be effected by many of the processes and presses known in the printing art, such as a letter press. If the pattern is printed with ordinary ink, it may be optically scanned and if it is provided with magnetically conductive ink, it may optically or magnetically be scanned.

The carrier according to the invention may be a length of film, or a layer of a suitable metal oxide, such as iron oxide, supported on a base. The base may constitute a frame for a picture area to be viewed. It may also be a punch card or a slotted card to be sorted, for instance, by needle sorting.

In accordance with the invention, the picture area to be viewed during the playback of the associated message may be a transparency for projection upon a viewing screen, an opaque picture for epidiascopic viewing, or a transparency directly viewable by means of suitable illumination such as an X-ray picture. In the event the carrier is simply a sheet of paper or cardboard upon which the track is printed with printer's ink or magnetically conductive ink, the sheets may be bound in a book, inserted in a suitable binder, or simply placed in a container.

Other and further objects, features and advantages of the invention will be pointed out hereinafter and set forth in the appended claims constituting part of the application.

In the accompanying drawing several preferred embodiments of the invention are shown by way of illustration and not by way of limitation.

Figures 1, 2, 3:
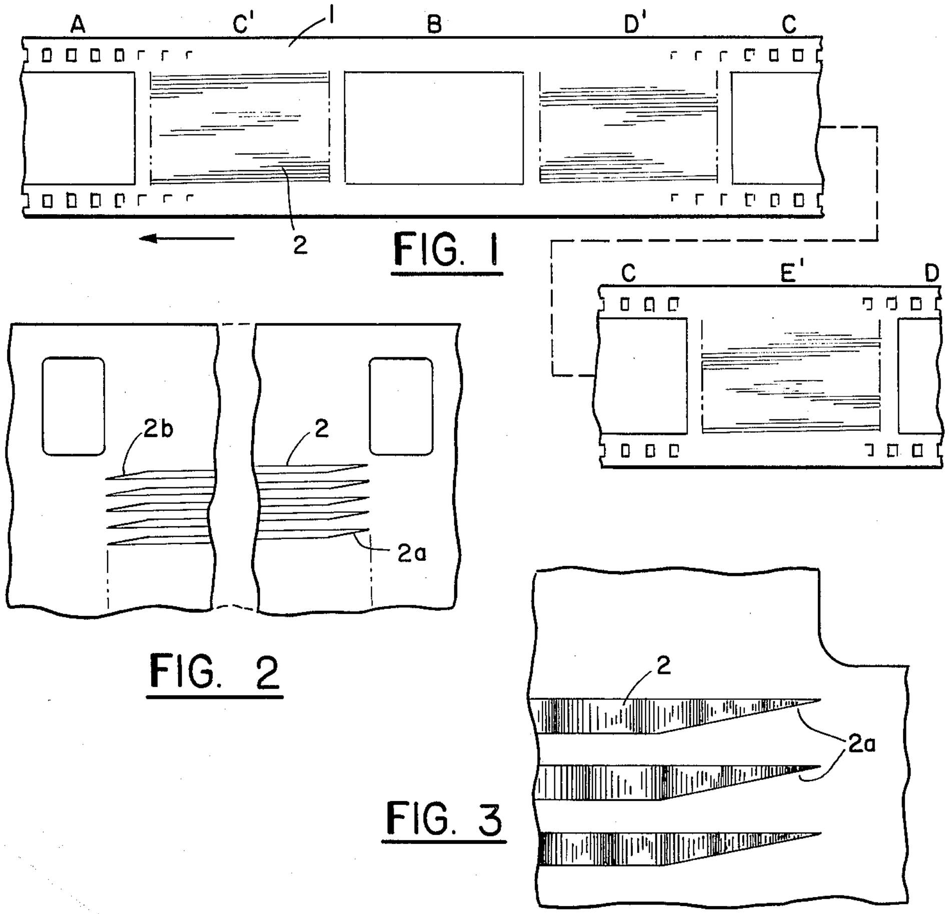
FIG. 1 is a fragmentary plan view of one form of a combined picture and sound record area carrier.
FIG. 2 is a plan view of an enlargement of one of the sound record areas to show the fade-in and fade-out portions of each track section.
FIG. 3 is a further enlargement of track sections to show the fade-out or fade-in more in detail.

Referring first to FIGS. 1, 2 and 3 in detail, the length of film 1 shown in FIG. 1 carries picture areas A, B, C and D which are separated from each other by sound record areas C′, D′, E′ etc. The sound record areas on the film are in advance of the associated picture areas as seen in the direction in which the film is intended to be fed through a sound projector. While the picture areas and the sound areas alternate on the film, the associated areas are not necessarily disposed directly adjacent to each other, and in fact they are generally not disposed adjacent to each other. For instance, between picture area C and the corresponding sound record area C′, a sound record area D′ and a picture area B are interposed. The picture area D associated with the sound record area D′ is partly shown; the sound record area associated with picture area B would be to the left of the figure. The length of each sound record area may be equal to that of a picture area, but it may also be of greater length. For instance, a picture area may occupy one frame of film and the associated sound record area two or more frames.

As is apparent, each sound record area includes a plurality of individual, discontinuous and longitudinally oriented sound track sections 2. The track sections are parallel to each other, but inclined in reference to either longitudinal edge of the length of film. While in theory any number of parallel track sections may be provided, in practice the number of lines is determined by the total width of the used film, the width of the individual lines and the required spacing between each two lines. In practice, the lines may be as close to each other as is compatible with the scanning of the lines. The lines should be visualized as constituting part of a helix when a sound record area is brought into a cylindrical configuration.

In order to effect the aforementioned continuous reproduction of sound from the discontinuous track sections, each track section has at its ends a fade-out portion and a fade-in portion respectively. These portions are shown as wedge shaped fade-out portions 2*a* and fade-in portions 2*b*. As is clearly shown in FIG. 2, the slanted lines of the two wedge portions 2*a* and 2*b* of each track section face in opposite directions at the two ends of each section.

Assuming now that scanning for reproduction is effected by scanning the successive track sections, starting with the lowermost section and progressing toward the uppermost section, it will be observed that scanning of the fade-out portion of a track section will be coincidental with the scanning of the fade-in portion of the next upper track section. Consequently, if the scanning operation is so correlated that the scanning of the fade-out portion and the next following fade-in portion overlap accurately, a continuous reproduction of sound is obtained. In other words, when the sound record areas shown in FIG. 1 are brought into a cylindrical shape, the sound record lines thereon constitute a continuous helical sound track of equal width from which continuous sound can be reproduced.

As is apparent, FIG. 3 shows fade-out portions when scanning is effected from left to right, but fade-in portions when scanning is effected from right to left.

Figure 4:
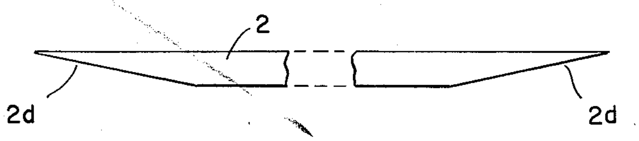
FIGS. 4, 5 and 6 are detail views of individual sound track sections to show fade-in and fade-out portions of the track sections in accordance with the invention.
Figure 5:
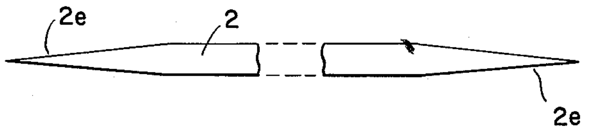
Figure 6:
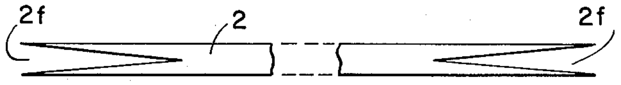

FIGS. 4, 5 and 6 show further configurations of suitable fade-in and fade-out portions of track sections 2.

According to FIG. 4, the track section is formed at both ends with wedge shaped portions 2*d* facing in the same direction.

FIG. 5 shows a tapered portion 2*e* at both ends of the track sections.

FIG. 6 shows swallow-tailed or serrated end portions 2*f*.

In each configuration of end portions the decrease in sound volume at the end of the scanning of a track section is matched by a corresponding increase in sound volume at the beginning of the scanning of the next following track section as seen in the direction in which the scanning progresses, for instance, from the lowermost track section toward the uppermost track section.

Figure 18:
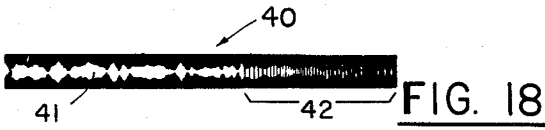
FIG. 18 is a fragmentary view of a variable area type track section with a fade-out or fade-in portion of the variable density type.

In the event the track is recorded by the variable area method, fade-out and fade-in at the end and beginning respectively may be effected by combining a variable area type track section 41 with a variable density pattern 42. As shown in FIG. 18, the variable density pattern is superimposed upon the variable area pattern and gradually increases in density toward the respective end of the track section at which the pattern is shown to be opaque. When during scanning the track section is brought into cylindrical shape as previously described the variable density pattern at the end of a track section and the variable density pattern at the beginning of the next adjacent track section are simultaneously scanned so that the densities of the scanned density patterns correspondingly increase and decrease respectively whereby the sound volume is maintained at a substantially constant level during the transition of the scanning from one track section to the next one.

Figure 7:
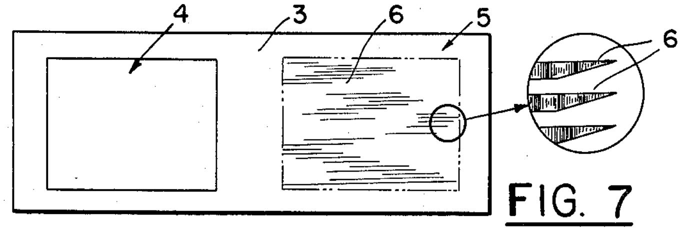
FIG. 7 shows a length of film bearing a single picture and an associated sound record area, the track sections of which are recorded by the variable density method and slightly slanted in reference to the longitudinal edges of the film.

FIG. 7 is a length or piece of film 3 bearing a single picture area 4 and a single sound record area 5. The picture area may be a transparency designed for direct viewing, in which event the picture area should be illuminated from underneath. The picture area may, for instance, be an X-ray photograph.

The sound record area is shown as a variable density type area formed by a plurality of parallel, slightly slanted track sections 6. Each track section has at its ends a fade-in portion and a fade-out portion, for instance, of the kind shown in FIG. 3.

Figure 8:
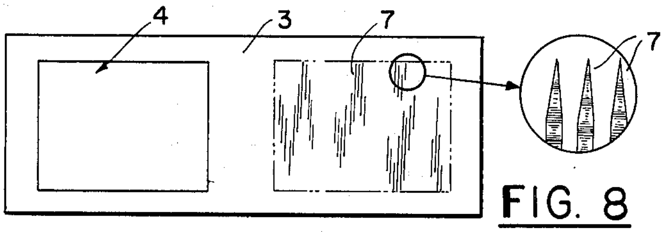
FIG. 8 is a length of film similar to FIG. 7, but the sound track sections are shown to be steeply slanted in reference to the longitudinal edges of the length of film.

FIG. 8 shows a carrier similar to the one shown in FIG. 7 except that the track sections 7 are recorded at a steep angle in reference to the longitudinal edges of the length or piece of film. The fade-in and fade-out portions of the track sections are shown as being of the type illustrated in FIG. 5, but they may, of course, also be of the kind shown in FIG. 3. Generally, the track sections 6 of FIG. 7 or 8 may be of any of the types shown in the figures exemplifying different configurations of the fade-in and fade-out portions. Furthermore, variable area type recording may also be used in the arrays of picture areas and sound track areas as shown in FIGS. 1, 7 and 8.

Figure 9:
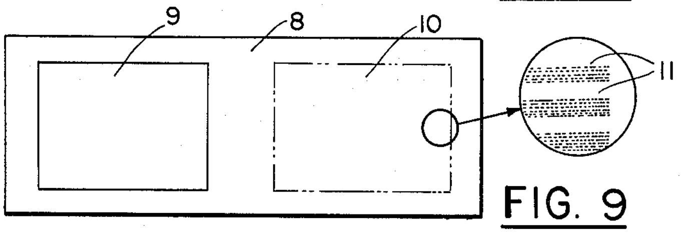
FIG. 9 is a card providing a picture area and a sound record area on which sound track sections are magnetically recorded, the sound track sections extending substantially lengthwise of the card.

FIG. 9 shows a carrier 8 in the form of a card which may either be a sheet of transparent film or a sheet of an opaque material such as cardboard. The picture area 9 may be photographically printed on the carrier if the same is a transparent film, or a transparent picture may be fitted in an opening provided in an opaque carrier for the purpose. It is further possible to attach a picture to an opaque carrier, or print a picture directly upon the carrier. Each picture then may be viewed directly, or by epidiascopic projection.

The sound record area 10 is shown in the form of a layer of a suitable magnetizable metal oxide, on which the track sections are magnetically recorded in the usual manner. Individual track sections 11 are shown in the insert figure on an enlarged scale. The track sections extend generally lengthwise of the strip, slightly slanted in reference to the longitudinal edges thereof.

Figure 10:
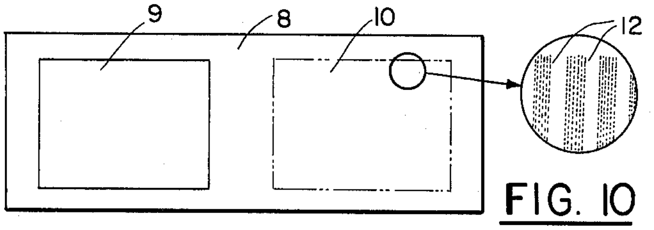
FIG. 10 is a card similar to FIG. 9, but the sound track sections are at a steep angle in reference to the longitudinal edges of the card.

FIG. 10 shows a carrier arrangement similar to that of FIG. 9, except that the individual track sections 12 are steeply slanted in reference to the longitudinal edges of the strip. Such record lines may be recorded by means of a rotary sound head.

Figure 11:
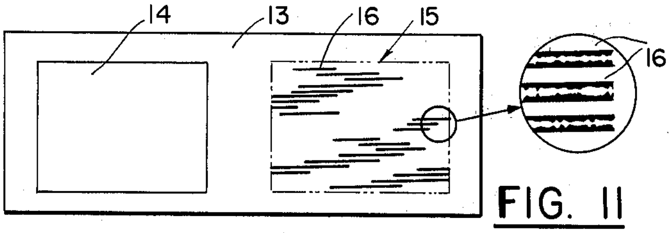
FIG. 11 is a carrier in the form of a card providing a picture area and a sound track area on which track sections of the variable area type are printed.

FIG. 11 shows a carrier 13 in card form which may be made of light transmitting material such as photographic sheet film, or opaque material such as cardboard. If the carrier is light transmitting a picture 14 may be photographically printed on the carrier for projection upon a screen or for direct viewing by suitable illumination of the picture area. If the carrier is opaque a transparency may be inserted in an opening of the carrier, or the picture may be adhered to or printed directly upon the carrier for epidiascopic viewing.

The sound track area 15 comprises track sections 16 of the variable area type. These track sections are printed with magnetically conductive ink or paint.

Figure 12:
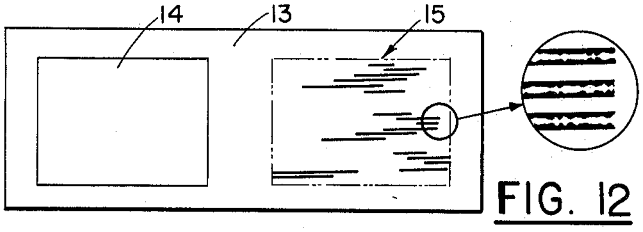
FIG. 12 is a carrier in the form of a card similar to FIG. 11, but the variable area type track sections are photographically produced on the sound record area of the card.

FIG. 12 is similar to FIG. 11, except that variable area type track sections on a transparent card 17 are photographically recorded on the carrier 13 made of photographic sheet material.

Figure 13:
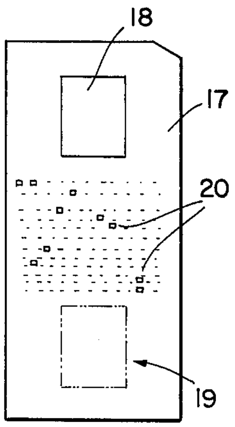
FIG. 13 is a carrier in the form of a punch card on which are provided a picture area and a sound track area.

FIG. 13 shows a card 17 of the punch card type. The card as shown has mounted or printed thereon a picture 18 for epidiascopic viewing. The card may also have a cut-out forming a frame for insertion of a transparency. If the card is made of transparent material, such as photographic sheet material, the sound record area 19 may be photographically printed. The track sections may either be of the variable area type or of the variable density type. Variable area type track sections may also be printed with ordinary printer's ink or magnetically conductive ink. Both variable density tracks and variable area tracks may be formed with fade-in portions and fade-out portions as previously described. The card is shown as including a plurality of punch holes 20 which can be probed by suitable equipment to convey information in accordance with the location of the punch holes.

Figure 14:
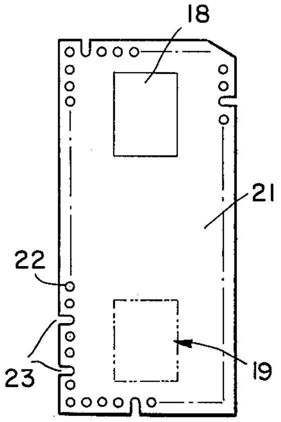
FIG. 14 is a carrier in the form of a card designed for needle sorting and also providing a picture area and a sound record area.

FIG. 14 shows a card 21 which is similar to the one described in connection with FIG. 13 except that the card has a plurality of holes 22 and slots 23. Cards of that kind are used for needle sorting. Depending upon the presence and location of either the holes or slots, the cards are sorted out of a pile of cards by the sorting equipment.

Figure 15:
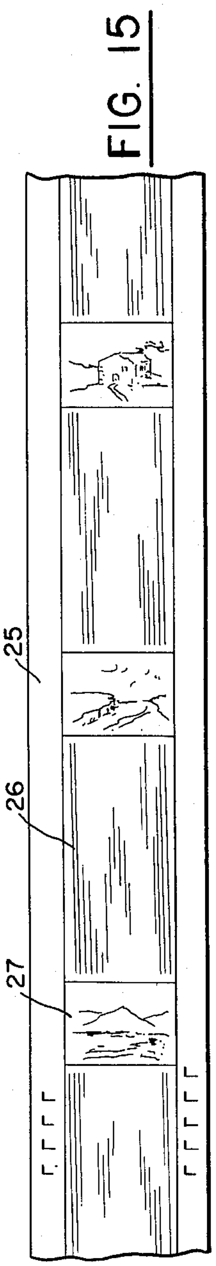
FIG. 15 is a length of film on which several picture areas and several sound record areas are provided in longitudinally spaced alternating relationship, each picture area being shown as occupying one frame of the film and each sound track area as occupying several frames.

FIG. 15 shows a length of film 25 similar to the length of film 1 of FIG. 1, except that each sound record area 26 occupies the equivalent of several frames of the film, whereas each picture area 27 comprises the equivalent of one frame only. The use of a length of film according to FIG. 15 is advantageous when the message associated with a picture is of considerable length.

Figures 16, 17:
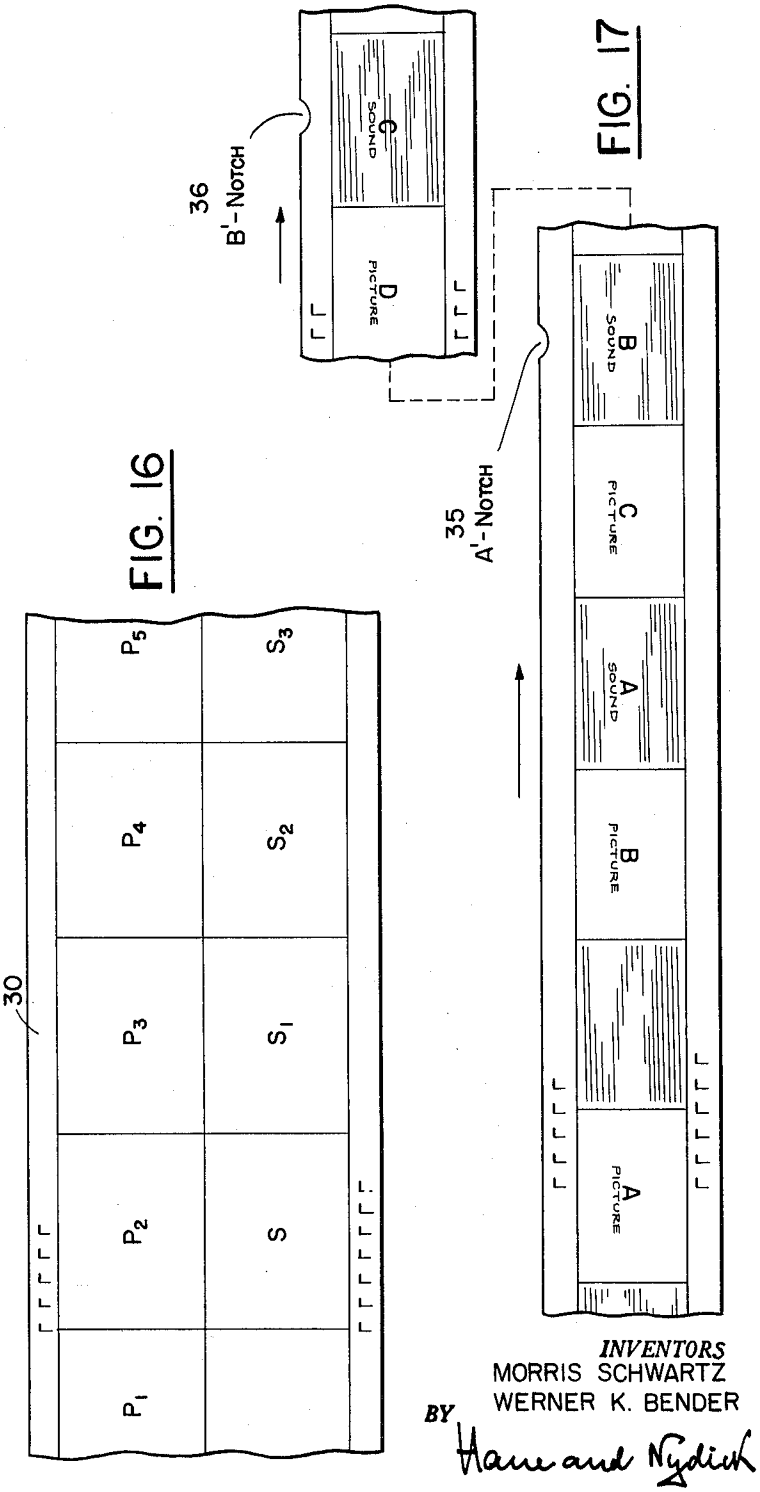
FIG. 16 is a fragmentary plan view of a length of film on which all the picture areas are disposed in one row and all the sound track areas in a parallel second row.
FIG. 17 is a length of film similar to the one shown in FIG. 1, the film being marked along one of its edges, each of the markings being correlated with one of the sound record areas.

FIG. 16 shows a length of film 30 on which all the picture areas designated by P are disposed in one row and all the sound record areas designated by S are disposed in a parallel second row. As has been explained in connection with FIG. 1, the sound record area associated with a picture area is usually not located directly adjacent to the picture area, but separated from the same by intervening picture or sound record areas belonging to other pairs. Similarly, in FIG. 16 the picture area and the associated sound record area are not disposed in transverse alignment, but lengthwise staggered in reference to each other as is indicated by the letter designations applied to each picture area and sound record area.

FIG. 17 shows a length of film similar to the length of film of FIG. 1. The film of FIG. 17 is provided with markings 35 and 36 shown as notches in one longitudinal edge of the film. The notches or other markings serve to activate the transport of the film in a sound projector in which the film is inserted for projecting and reproducing successive programs. As indicated, notch A′ is correlated with sound record area A and notch B′ is correlated with sound record area B. The sound projector includes control equipment moving along the edge of the film. As soon as the control means reach a notch, they activate the transport means of the projector. Each notch is placed in relation to the associated sound record area so that when the scanning assembly of the projector has completed the scanning of the respective sound record area the control means reach and engage the respective notch. Sound projectors of this kind do not constitute part of the present invention.

In each of the preceding figures a sound record area is shown in conjunction with a picture area. However, in certain instances it is also useful to provide a sound record area only. More specifically, the variable area type track sections according to FIG. 11 may be printed with magnetically conductive ink or printer's ink on sheets of paper, cardboard, or film which then may be placed in a binder, book or container.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A sound track record comprising a carrier having thereon a variable area track in the form of a plurality of discontinuous and rectilinear parallel sound track sections disposed side by side, one end of each of said track sections and the opposite end of an adjacent track section constituting a continuation of a recorded message to effect continuity of a reproduction of the message upon sequential scanning of the track section in the same direction, each of said track sections having at its beginning as seen in the direction of scanning and at its opposite end a superimposed portion of gradually increasing density, said graduated portions at the end of each track section and at the beginning of a next adjacent track section respectively complementing each other to the full effective density of the sound track, each of said graduated portions constituting sound fade-out and fade-in portions, respectively, to maintain a substantially full and uniform sound volume during the transition of the scanning from one track section to the next one.

2. A combination picture and sound record carrier for simultaneously viewing and sound reproducing picture and sound, respectively, while the carrier is stationary, said carrier comprising a strip of film including a row of picture areas and a row of sound record areas, each of said sound record areas having thereon a variable area sound track representing a continuing recorded message, said track being in the form of a plurality of rectilinear and separate continuous parallel sound track sections disposed side by side spaced apart and extending substantially lengthwise of the film but slightly slanted in reference to the longitudinal edges thereof, one end of each of said track sections and the opposite end of an adjacent track section constituting a continuation of a recorded message whereby upon sequential scanning of the track sections always in the same direction the recorded message is reproduced in continuity, each of said track sections having at its beginning in the direction of scanning a superimposed fade-in portion gradually increasing in density toward the respective end of the track section and at its end a superimposed fade-out portion also gradually increasing in density toward the respective end of the track section, the fade-out and fade-in portions of each two adjacent parallel track sections complementing each other to the full effective density of the sound track to maintain a substantially full sound volume during the transition of the scanning from one track section to the next one, said row of picture areas and said row of sound record areas being disposed side by side parallel to each other, each picture area being paired with a sound record area, the two areas of each pair being lengthwise staggered in reference to each other, and each such pair constituting an audio-visual presentation.

3. A combination picture and sound record carrier for simultaneously viewing and audibly reproducing a picture and sound, respectively, while the carrier is stationary, said carrier comprising a card having open and closed cut-outs to effect needle sorting of the card, said card having in one portion a window frame for inserting therein a picture for viewing during sound reproduction and bearing a sound record area on another portion, said sound record area having thereon a sound track representing a continuing audibly reproducible recorded message associated with the picture to be viewed, said track being in the form of a plurality of separate continuous rectilinear parallel sound track sections disposed side by side, one end of each of said track sections and the opposite end of an adjacent track section constituting a continuation of the recorded message, whereby upon sequential scanning of the separate track sections always in the same direction the message recorded on the sound record area is audibly reproduced in continuity, said picture and sound track constituting an audio-visual representation, the card including an area coated with a magnetizable metal oxide on which are recorded said separate sound track sections.

4. A combination picture and sound record carrier for simultaneously viewing and reproducing picture and sound respectively while the carrier is stationary, said carrier comprising a card having one portion including a window frame for inserting therein a picture for viewing during sound reproduction and another portion bearing a sound record area, said sound record area including a sound track representing a continuity recorded message said track being in the form of a plurality of discontinuous and rectilinear parallel sound track sections disposed side by side, one end of each of said track sections and the opposite end of an adjacent track section constituting a continuation of the recorded message, each of said track sections being formed by hardened magnetically conductive ink printed upon said base and defining a variable area type sound track.

5. A combination picture and sound record carrier for simultaneously viewing and reproducing picture and sound, respectively, while the carrier is stationary, said carrier comprising a card having one portion including a window frame for receiving a picture for viewing during sound reproduction and another portion bearing a sound record area, said sound record area having thereon a variable area type sound track representing a continuing recorded message, said sound track being in the form of a plurality of rectilinear and discontinuous parallel sound track sections disposed side by side, one end of each of said track sections and the opposite end of an adjacent track section constituting a continuation of the recorded message, each of said track sections having at its beginning in the direction of scanning a fade-in portion gradually increasing in density towards the respective end of the track section and at its end a fade-out portion also gradually increasing in density towards the respective end of the track section, the fade-out and fade-in portions of each two adjacent parallel track sections complementing each other to the full effective density of the sound track to maintain a substantially full sound volume during the transition of the scanning from one track section to the next one whereby upon sequential scanning of the track sections always in the same direction the recorded message is reproduced in continuity.

6. A strip of film for projection and reproduction therefrom while the film is stationary, said film having thereon picture areas and sound record areas alternately disposed in longitudinally spaced relationship, the sound track of each of said sound record areas being in the form of a plurality of separate rectilinear and parallel track sections, the recording being continued from the end of one track section to the beginning of the next adjacent track section, said track sections being inclined in reference to a common rectilinear reference line whereby said track sections when brought to a cylindrical configuration transverse of the length thereof constitute parts of a continuous helical line, said strip of film having marginal notches lengthwise spaced in correlation with the sound record areas thereon, the location of each notch signifying a completion of a scanning of the sound record area correlated with the respective notching.

References Cited by the Examiner

UNITED STATES PATENTS

| | | | |
|---|---|---|---|
| 1,956,624 | 5/1934 | Ramsey | 274—41.6 |
| 2,314,417 | 3/1943 | Neal | 274—42 |
| 2,333,463 | 11/1943 | Bryce | 274—41.4 |
| 2,369,572 | 2/1945 | Kallman | 274—43 |
| 2,559,505 | 7/1951 | Hiller | 274—41.4 |
| 2,925,753 | 2/1960 | Schwartz | 88—28 |
| 2,983,210 | 5/1961 | Baril et al. | 95—77.5 |
| 3,001,444 | 9/1961 | Castedello et al. | 352—27 |
| 3,046,836 | 7/1962 | Schwartz | 88—28 |
| 3,100,431 | 8/1963 | Hayes et al. | 95—73 |

NORTON ANSHER, *Primary Examiner.*

JOHN P. WILDMAN, EMIL G. ANDERSON, *Examiners.*